Sept. 28, 1965  F. E. CARROLL, JR., ETAL  3,208,573
COIN-OPERATED DEVICES FOR VENDING SERVICES
OR ARTICLES OR THE LIKE
Filed Aug. 26, 1964  4 Sheets-Sheet 1
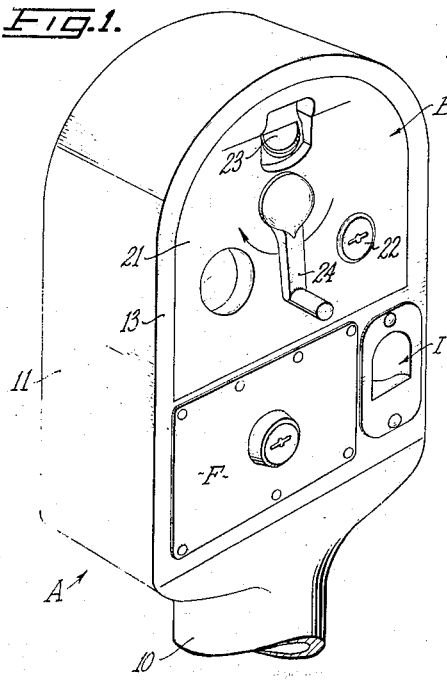
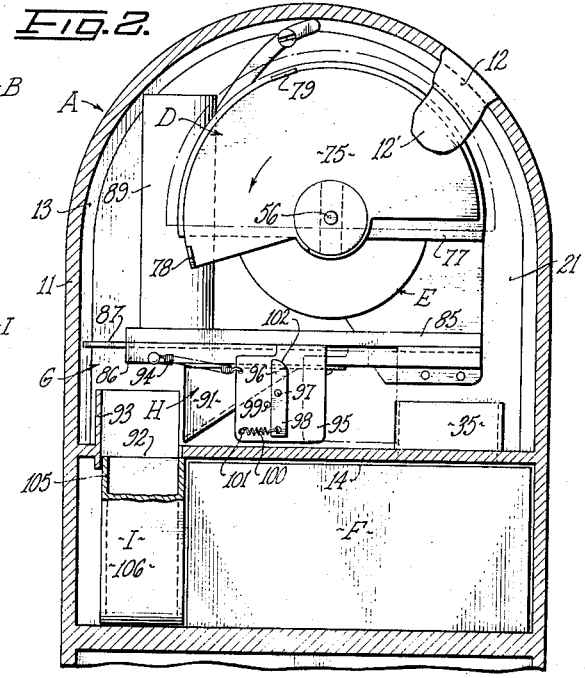
INVENTOR.
FRANK E. CARROLL, JR.
CHANNING C. EDINGTON
BY
*Lynn H. Latta*
ATTORNEY

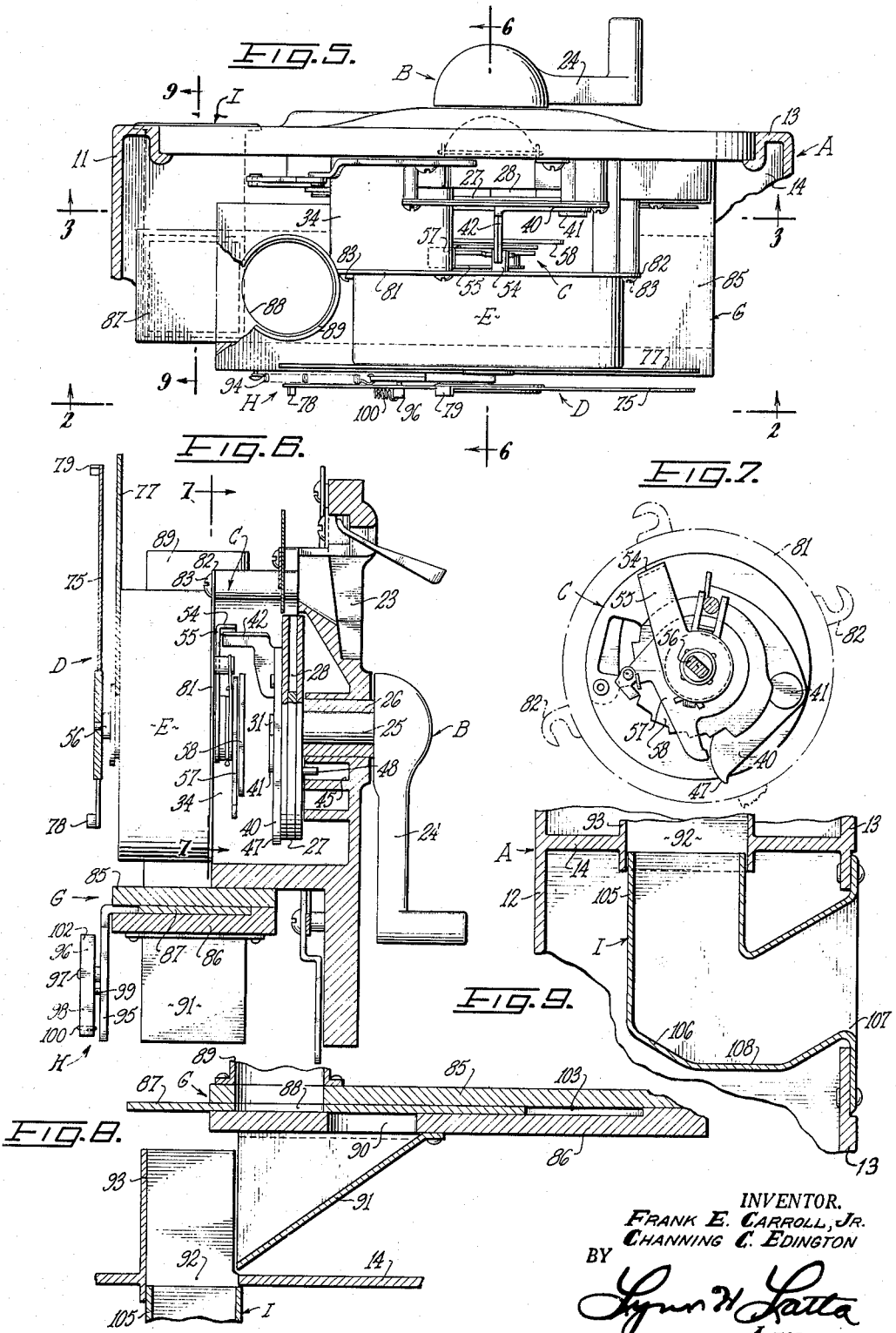

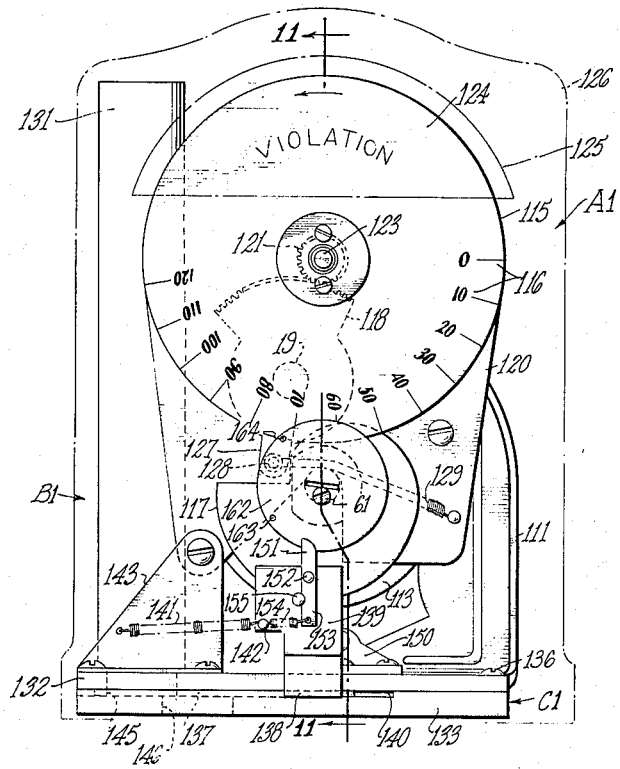

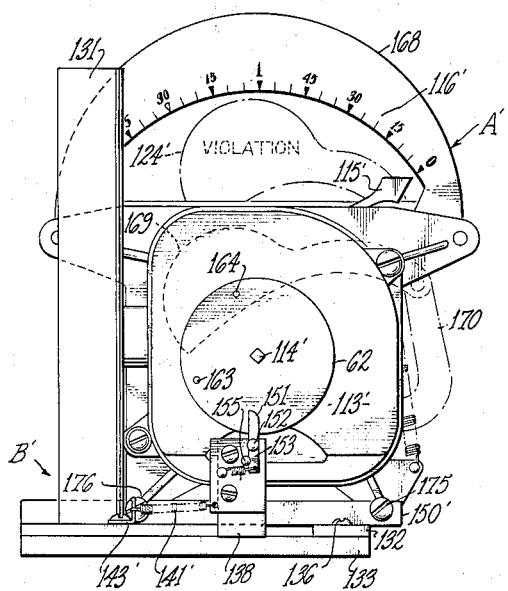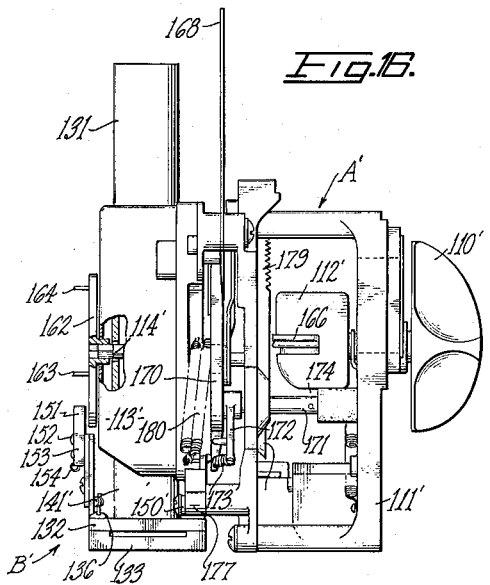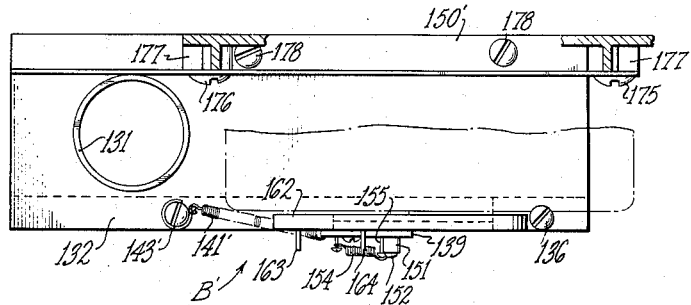

United States Patent Office 3,208,573
Patented Sept. 28, 1965

1

3,208,573
COIN-OPERATED DEVICES FOR VENDING
SERVICES OR ARTICLES OR THE LIKE
Frank E. Carroll, Jr., Los Angeles, Calif. (4465 Petit
Ave., Encino, Calif.), and Channing C. Edington, 10889
Wilshire Blvd., Los Angeles, Calif.
Filed Aug. 26, 1964, Ser. No. 393,480
20 Claims. (Cl. 194—2)

This application is a continuation-in-part of our prior U.S. patent applications S.N. 126,590, filed July 25, 1961, and Serial No. 176,375, filed February 28, 1962, now abandoned, both for Coin Operated Devices for Vending Services or Articles and the Like.

This invention relates to coin operated devices for vending services or articles, such as parking meters for vending parking time, and has as its general object to provide a vending device which, in addition to its conventional function of vending a service or product (e.g. registering paid parking time on a meter) has the additional function of issuing a token or other evidence of the payment for the parking time or other service or product, which token or other evidence can be negotiated to a merchant or other sponsor so as to obtain refund of all or a portion of the amount paid for the parking time or other service or product, or to obtain a credit on a purchase.

A further object of the invention is to provide a token-issuing device adapted for attachment to a device such as a common type of parking meter in an arrangement such that the existing actuating mechanism of the meter will be effective to actuate the attachment for token-dispensing in addition to its established function of actuating the meter.

More particularly, the invention contemplates a token-dispensing device attachable to a conventional parking meter or the like in a manner to be actuated by the existing parking meter setting mechanism without eliminating altering or disturbing the existing features and functions of operation of the meter.

A further object is to provide, in a parking meter, a token-dispensing device which is fool-proof and will not issue a token except in response to the deposit of the exact amount of money required by the parking meter for the purchase of time.

The term "token" is used herein in a broad sense, to include coin-like tokens, cardboard slips, tickets of paper or other material, and other equivalent devices.

Other objects and advantages will become apparent in the ensuing specifications and appended drawings, in which:

FIG. 1 is a perspective view of a conventional parking meter equipped with the attachments of our invention, as viewed from the rear side where the meter is actuated; looking forwardly;

FIG. 2 is a sectional view (looking rearwardly) in a vertical transverse plane in which the actuating mechanism of our token dispensing attachment is seen, as indicated by line 2—2 of FIG. 5;

FIG. 3 is a sectional view (looking rearwardly) in a vertical transverse plane rearwardly of the plane of FIG. 2, as indicated by lines 3—3 of FIG. 5;

FIG. 4 is a fragmentary enlarged detail view of portions of the mechanism seen in FIG. 2, in their relative positions at the beginning of a dispensing stroke, again looking rearwardly;

FIG. 5 is a plan view of the meter with attachment, with its housing broken away;

FIG. 6 is a sectional view in a fore-aft vertical plane, with rotary parts shown in side elevation, approximately as indicated by line 6—6 of FIG. 5;

2

FIG. 7 is a detail sectional view in a vertical transverse plane, looking rearwardly as indicated by line 7—7 of FIG. 6, illustrating parts of the conventional meter to which the invention is applied;

FIG. 8 is a vertical sectional view taken longitudinally through the token dispensing slide;

FIG. 9 is a detail vertical sectional view of the token delivery pocket, taken on line 9—9 of FIG. 5;

FIG. 10 is a front elevational view of a parking meter with vending attachment embodying a modified form of our invention;

FIG. 11 is a vertical sectional view of the same taken on the line 11—11 of FIG. 10;

FIG. 12 is a side elevational view of the same;

FIG. 13 is a fragmentary front elevational view of the same showing the parts in another stage of operation and with some parts broken away and shown in section;

FIG. 14 is a fragmentary plan view of a parking meter embodying another modification of the invention, with parts broken away and shown in section;

FIG. 15 is a front elevational view of the same, with housing removed; and

FIG. 16 is a side elevational view of the same, with parts broken away and shown in section.

Referring now to the drawings in detail, and in particular to FIGS. 1-7 thereof, we have shown therein, as an example of one form in which the invention may be embodied, the combination of our token-dispensing attachment with a common type of parking meter embodying a pedestal-supported housing A; a removable back plate, coin slot and actuator crank assembly B which is normally locked into an opening in the rear side of housing A, said assembly including parts attached to the operating crank for turning therewith and for transmitting drive through a coin (FIG. 3); an assembly C of transmission parts (FIGS. 5-7) adapted to receive drive from the actuator assembly B when a coin has been inserted into the meter to function as a driving link between the two assemblies in setting and winding the meter; and an indicator dial and "violation" flag assembly D (seen only in FIGS. 2, 5 and 6) incorporating certain features of conventional indicator dial assembly, modified by adding thereto rotary actuator parts for actuating the token dispensing attachment of our invention. The conventional meter apparatus further includes a clockwork timer unit E for resetting the dial mechanism D back to time-expired condition, exposing a conventional "violation" flag to view; and a receptacle F into which coins are deposited after having served their function of transmitting movement from the actuator assembly B to the actuated assembly C.

The token dispensing attachment of our invention comprises, in addition to the rotary actuator parts of modified dial assembly D, a token slide assembly G for delivering tokens from a magazine; a slide-moving assembly H attached to the slide assembly G and adapted to be engaged by the rotary actuator parts of dial assembly D for actuating the slide assembly G when purchased time is being registered upon the dial assembly D; and a token-delivery cup I for delivering one or more tokens to a person purchasing parking time on the meter.

*FIGS. 1–9*

To facilitate understanding of the token-dispensing attachment of our invention and how it is combined with a conventional meter for conjoint operation therewith, we will first identify the particular type of parking meter chosen for the purpose of illustration of one embodiment of the invention. The selected embodiment utilizes a meter of a manually actuated type wherein the manual actuation simultaneously sets a purchased-time indicating dial and winds a spring-powered clock-work timer for resetting such dial mechanism back to "violation" condition during the period of time that has been purchased (e.g. a half hour, a full hour, or other time period for which the meter may be adjusted).

*Housing unit A.*—comprises a supporting pedestal 10 terminating at its upper end in a housing including an arched lateral wall 11, a front wall 12 (FIGS. 2 and 9) having a conventional glass-closed window 12' through which the dial mechanism D can be viewed, a rear wall 13 which has an opening normally closed by the back plate of actuator assembly B, and which has in its lower area, in side-by-side relation, an aperture normally closed by the coin drawer F and a smaller aperture in which is mounted the token delivery cup I; and a horizontal partition wall 14 (FIG. 2) which divides the interior of the housing into a relatively large upper compartment (of vertical area corresponding to the back plate of assembly B in which the operating assemblies B, C, D and E are contained) and a shallower bottom compartment, in which the coin drawer F and token delivery cup I are accommodated.

*Actuator assembly B.*—comprises a back plate 21 closing the aperture in rear wall 13 and having a tumbler lock 22 and associated locking mechanism 20 for normally locking it in closed position; a coin receiving mouth 23 in the top thereof; and an actuator crank 24 secured to the rear end of an actuator shaft 25 (FIG. 6) which is journalled in a bearing 26 in backplate 21.

*Transmission mechanism C.*—(FIGS. 5 and 6) comprises a coin-transporting rotor 27 rotatably mounted on the forward end of crank shaft 25, just forwardly of back plate 21 and having a coin-receiving pocket 28 normally disposed at the top thereof in communication with the inner end of mouth 23 to receive a coin inserted therethrough. Rotor 27 is adapted to be coupled to shaft 25 (to receive one-way drive therefrom) by a ratchet 31 secured to the inner end of shaft 25, and a pawl 31' carried by rotor 27. A coin-abutment finger 32 is connected by a pivot 33 to the rotor 27 and, at the top of its orbital path, drops by gravity radially into the coin pocket 28 to be engaged by a coin in pocket 28 so as to transmit rotation to the timer E from rotor 27. At the bottom of its orbital path it drops by gravity radially outwardly to a position projecting beyond the periphery of rotor 27, to facilitate discharge of the coin by gravity from the pocket 28 and to sweep the coin into a discharge chute 35. A semi-cylindrical cam 34 projects forwardly as an integral extension of back-plate 21 substantially coextensive with the path of arcuate travel of the coin as conveyed in pocket 28, the cam 34 restraining radially outward displacement of the coin under wedging pressure thereagainst, until the coin clears the lower end of cam 34 and is projected downwardly through the discharge chute 35 and through the partition 14 into coin drawer F as indicated by arrow 36 in FIG. 3. To reach the discharge chute 35, the coin passes over and behind the lower end of a blocking finger 37 into a conventional windowed coin-display recess (not shown), from which it may later drop into the chute 35. When the mechanism B-D is removed from the housing A, finger 37, which is linked to locking mechanism 20, moves to the obstructing position shown in dotted lines, to prevent the coin from dropping out of the unit. A transmission lever 40 is connected by a pivot 41 to the forward side of rotor 27 and has a driving head 42 projecting forwardly for transmitting winding movement to timer E, when head 42 is in a radially inwardly shifted position shown in FIG. 3. Head 42 has an integral finger 43 projecting rearwardly through a slot 44 in rotor 27 and lever 40 has a tail 47 with a cam follower stud 48 in camming engagement (during its orbital movement) with a cam 45 on back plate 21. Cam 45 moves the finger 43 radially inwardly as it approaches the zenith of its orbit, and permits the finger 43 to quickly shift radially outwardly just after passing the position shown in FIG. 3 (except when a coin has been inserted in pocket 28, when finger 43 will be held inwardly by the coin until it reaches coin-discharge position).

A spring 46, acting on tail 47 of lever 40, biases it constantly for clockwise tilting movement (as viewed in FIG. 3) so that finger 43 will snap outwardly by spring action whenever it is released from restraint by cam 45 or by a coin.

Movement is transmitted to timer E by engagement of head 42 against a rearwardly projecting finger 54 on the outer end of an arm 55 which is rotatably mounted on the rear end of a timer winding shaft 56. This will occur only when the finger 43 of lever 40 is held in its radially inward position by a coin engaged between the finger 43 and the inner wall of cam 34. If no coin is present, the finger 43, having been released to its radially outward position by the step in cam 45, will pass the finger 54, clearing the outer extremity thereof. Arm 55, when moved arcuately by finger 52, engages and transmits arcuate movement to a pawl unit 57 through which a winding ratchet 58 is rotated, transmitting movement to timer-winding shaft 56 to which it is secured. Looking rearwardly, as in FIGS. 2, 3 and 7, such winding movement is counter-clockwise, responding to the clockwise movement of crank 24, as viewed from the rear of the meter during a setting operation (FIG. 1). The winding movement is terminated by release of transmitting finger 40 when the coin leaves the pocket 28, causing the transmission lever 40 to be tilted so as to move its finger 42 outwardly to release finger 54 of arm 55.

*Indicator dial assembly D.*—comprises a "violation" flag in the form of a disc-sector 75 having a hub mounted upon the forward end of timer shaft 56 and, in its normal position shown in FIG. 2, covering the indicator face of a fixed dial 77 which is mounted in a fixed position upon a forward face of timer E. Projecting forwardly from the periphery of sector 75 are a pair of actuator lugs 78 and 79 for actuating the token dispensing slide assembly G. At this point it may be noted that, upon insertion of one coin for transmission of one stroke of crank 24 to the dial unit D through ratchet mechanism 57, 58, the leading actuator lever 78 will engage the actuator portion H of slide assembly G to effect one stroke of slide operation, thus dispensing one token and leaving the sector 75 in the position to which it was thus moved in effecting this initial dispensing stroke; and if a second coin is inserted and a second stroke of crank 24 is transmitted to the dial assembly D, the sector 75 will be moved an additional distance, causing the second actuator lug 79 to engage the unit H to transmit a second stroke to the dispensing slide G, thus dispensing a second token in return for the second coin. It will be understood that any selected number of actuator lugs (from one up to five or more) and a corresponding number of immediately succeeding token dispensing actuations of slide unit G, may be utilized. Also, where a coin of large denomination (such as a dime) is inserted into the meter, it will maintain driving engagement between rotor 27 and finger 54 over an arcuate path twice as long as in the use of a nickel, thus causing both actuator lugs 78, 79 to effect respective token-dispensing strokes of slide G, in immediate succession.

*Timer unit E.*—is of conventional construction including a spring motor (not shown) which is wound by the rotation of shaft 55 which effects the setting of dial unit D to indicate purchased time on the meter and actuates the token dispensing slide G, and which spring motor is then operative to drive conventional escapement clockwork mechanism to return the shaft 55 and the "violation" flag 75 to starting positions at a timed rate in accordance with conventional meter operation.

*Timer E.*—at the rear side of its housing, has a mounting flange 81 (FIG. 7), with a series of slotted ears 82 by means of which the timer is attached to the forward side of cam 34 by cap screws 83 (FIGS. 6 and 7). In FIG. 7 taken immediately rearwardly of the mounting flange 81, the latter is shown in phantom.

*Token dispensing slide unit G.*—comprises upper and lower ways 85 and 86 one of which is provided with a shallow flat longitudinal groove in which is slidably received a slide bar 87 in the form of a thin plate having a token receiving aperture 88 which is normally registered with the lower end of a token-magazine tube 89 secured to and projecting upwardly from the upper slide way 85. The slide unit G extends transversely beneath the timer E. In the retracted position of the slide bar 87, the lowermost token in the stack of tokens in magazine 89 will drop into the slide aperture 88, and actuation of the slide by an actuator lug 78 or 79 will move it toward position for delivery through a discharge aperture 90 in lower way 86, into a transfer chute 91 in which the token will slide back to a position beneath the magazine 89 and from which the token will drop through an aperture 92 in partition wall 14 into the delivery pocket I. A guide wall 93, projecting upwardly from partition wall 14 on three sides of aperture 92, and having an open side in communication with the open discharge end of transfer chute 91, functions to guide the tokens through the aperture 92. Slide bar 87 is yieldingly urged toward a retracted position by a spring 94 on one end of which is anchored to the forward side of lower slide-way 86 and the other end of which is anchored to the slide actuator unit H (FIG. 2).

*Slide-moving unit H.*—comprises a tab 95 formed integrally with the forward side margin of slide bar 87, extending through a slot 103 in the forward side of such unit H, clearing the sides of ways 85 and 86; a dog 96 mounted on a pivot 97 carrried by tab 95 and projecting upwardly and having a tail 98 projecting downwardly from the pivot, and a stop pin 99 mounted in the tab 95 below the pivot 97 in a position to engage the tail 98 for limiting the swinging movement of dog 96 at a vertical position where its upper end may be engaged by an actuator lug 78 or 79 in a manner to transmit a stroke to the slide 87 in the direction to transfer a token from magazine 89 to the discharge aperture 90. The dog 96 is yielding maintained in the said vertical position by a coil spring 100 which is connected under tension between the lower end of tail 98 and an anchor pin 101 mounted in tab 95. Thus the dog is maintained in position for engagement by an actuator lug 78, 79 each time the meter is set by a stroke of actuator crank 24.

Upon return movement of the sector 75 of dial assembly D by the timer E, the engagement of the upper end of the dial 96 by an actuator lug 78, 79 will cause the dog to be deflected in a tilting movement laterally and downwardly until it clears the actuator lug, permitting the lug to pass over it, and the dog will then snap back to its upright position shown in FIG. 2 under the pull of spring 100. Such tilting deflection (bypassing) of the dog 96 is assisted by a bevel ramp 102 on that corner of its upper end which is engaged by an actuator lug in its return movement.

*Token delivery cup F.*—shown in FIG. 9, has a head flange 105 by which it is attached to the underside of partition 14, registering with aperture 92, a tubular body 106 extending diagonally downwardly and forwardly toward the front wall 15 of housing A, a delivery mouth 107 mounted in an aperture in front wall 15, and a receiving pocket 108 at the bottom of 107.

FIGS. 10–13

Referring now to FIGS. 10–13 inclusive, we have shown therein, in combination with a parking meter A1, a modified form of our token dispensing attachment comprising, in general, a magazine and slide assembly B1, and a slide-setting mechanism C1.

*Parking meter A1.*—(FIG. 12) embodies a manual actuator handle 110, a back cover plate 111 in which the handle 110 is journalled; a coin operated coupling unit 112 for coupling the crank 110 to a spring powered timer 113, for winding the latter; a timer shaft 114 which is rotated in one direction by operation of crank 110 when a coin is present as a driving connection in the coupling 112, thereby simultaneously winding spring motor of timer 113 and setting an elapsed time indicating dial 115 (a thin circular disc) having elapsed time indicating characters 116 imprinted thereon; a setting cam 117 secured to timer shaft 114; a gear segment 118 mounted for rotary movement on a pivot 119 carried by a supporting plate 120 on the forward side of timer 113; and a spur pinion 121 meshing with gear segment 118 and secured to the hub 122 of indicator dial 115 which is rotatably mounted on a stud 123 carried by plate 120. Segment 118 has a tail lever 127 carrying a projecting pin 128 which is engaged by cam 117 for rocking the segment 118 to set the dial. A coil spring 129 is connected under tension between pin 128 and supporting plate 120, for returning segment 118 to a starting position. In the expired position of the meter, the expired time indicator characters 116 are positioned on the lower half of the dial face, the upper half, at 124 providing any suitable display indicative of the expired condition (e.g. the word "violation" or simply the color red) and being visible in a display window 125 of the meter housing which is shown in phantom at 126.

*Token dispenser unit B1.*—comprises a token magazine 131 in the form of a length of cylindrical tubing supported in a vertical position with its lower end attached to the cover plate 132 of a dispensing slide casing 133 of shallow channel section, having along its respective sides, longitudinally extending lands 134 and 135 which are secured to the cover plate 132 by screws 136, and defining a shallow flat slideway in which is slidably mounted an ejector slide 137. Slide 137 has, near its rear end, an integral laterally projecting arm 138, which is bent upwardly just forwardly of the slide casing 133 to provide a bracket 139. Arm 138 projects forwardly from slide 137 through a slot 140 in the forward side of casing 133.

Coin chute 131 might be supported by having its lower end received in a bore in cover plate 132 as shown in FIG. 13, with its lower end open for communication with slide 137. A coil spring 141, tensioned between respective connections to an anchor stud 142 mounted in the forward side of bracket 139, and a bracket 143 into which the forward end of the spring is hooked, springloads the ejector slide 137 for movement to a normal, projected position in which a token-receiving opening 145 in its forward end portion is registered with the lower end of magazine 131 as indicated in dotted lines in FIG. 10, whereby the lowermost token of the column in the magazine may drop into the opening 145. From this normal position, slide 137 is adapted to be retracted to a cocked position shown in FIG. 13, wherein the token opening 145 is registered with a discharge port 146 in slide casing 133, disposed in a position offset from the lower end of magazine 131 as shown. Spring 141 is further tensioned in such retracting movement of the slide.

Slide casing 133 and cover 132 are securely supported by an angle bracket 150 secured to cover 111 and the angle bracket 143 which is secured to the mounting plate 120. The slide casing is supported in a horizontal plane just below the horizontal lower margin of cover 111 and is receivable in the conventional housing 126 of the parking meter.

*Slide-setting mechanism C.*—comprises a dog 151 projecting upwardly from a pivot 152 by which it is connected to the upper end of bracket 139 for fore-aft tilting movement. Dog 151 has a tail 153 projecting downwardly from pivot 152. A short coil spring 154, connected under tension between the lower end of tail 153 and the anchor stud 142, normally biases the tail 153 forwardly into engagement with a stop pin 155 mounted in bracket 139, thus maintaining dog 151 in a normal upstanding position.

On the forward end of timer shaft 14 is a head 157 (FIG. 11). This is an existing part of the timer shaft. The invention provides a slide-actuator attachment comprising a hub 158 having at its rear end a circular recess 159 adapted to snugly fit over the head 157. Hub 158 has an eccentric bore 160, parallel to its axis, through which an anchor screw 161 is extended, the rear end of the screw 161 being threaded into the head 157 to secure the hub 158 thereto. Integral with hub 158 is an actuator disc 162 having a plurality of actuator fingers 163, 164 in the form of pins projecting forwardly from the disc. Although only two such pins are shown, it will be understood that additional pins and correspondingly additional stages of token dispensing can be utilized. During meter setting, rotation of actuator disc 162 in the counter-clockwise direction as viewed in FIG. 10, will cause one or more of the actuator pins 163, 164 to engage the end of dog 151 (which in its normal position overlaps disc 162 as shown in FIG. 10) and (since tail 153 is supported against stop pin 155) will transmit movement through the dog 151 and the bracket 139 to shift the slide 137 rightwardly as viewed in FIG. 10 to the position shown in FIG. 13 so as to transport a token or tokens from the lower end of magazine 131 to discharge port 146 and to drop it through that port into a suitable receptacle (not shown).

FIGS. 14–16.—show an adaptation of the invention to a Duncan parking meter A' wherein a setting knob 110' has a shaft journalled in a frame 111' and directly driving a coupling unit 112' (FIG. 16) wherein an inserted coin is operative to project one of a pair of dogs 166 forwardly from head 112' into driving engagement with a disc 167 which transmits winding movement to the timer shaft 114', to wind the timer 113', to shift a pointer 115' to a position indicating parking time on an indicator scale 116' on a fixed dial 168 of arched shape, and upon completion of the setting stroke, to lower a "violation" flag 124' which remains hidden from view until the purchased time has fully elapsed and the pointer 115' returns to the zero position shown in FIG. 15, when a "Time Expired" flag 169 will be spring-propelled upwardly to its position shown in phantom in FIG. 15.

Token dispenser unit B'.—is substantially the same as in FIGS. 10–13 (corresponding parts being indicated by the same reference numerals) but the spring 141' is somewhat shorter than the spring 141 and the bracket 143' is smaller than bracket 143.

The cover plate 132 of slideway 133 is mounted on the lower, horizontal leg of a bracket 150' consisting of an elongated angle strip (FIG. 14) the vertical leg of which is secured by screws 175 and 176 to forwardly projecting bosses 177 of the forward timer frame structure, the horizontal leg of bracket 140' extending rearwardly beneath the bosses 177. Attachement of the horizontal leg of the bracket to the cover plate 132 is by means of screws 178 extending downwardly through the bracket 140' between the bosses 177.

During the arcuate swing of coupling head 112' responsive to turning of a knob 110', a dog 166 will ratchet against a fixed arcuate ratchet sector 179, and if the stroke is not completed (e.g. where an illegal slug is used) the coupling head 112' will be restrained by sector 179 from returning to its starting position, and the "violation" flag 124' will remain raised.

The violation flag 124' is mounted on an arm 170 pivotally mounted on a shaft 171 to which there is secured an arm 172 which is angularly spaced from and yieldingly connected to arm 170 by a tension spring 173. A short lever 174 is secured to shaft 171 and projects inwardly for engagement by the coin head 112' when the latter returns to its starting position shown in FIG. 16, functioning to depress the violation flag to a concealed position. During the turning of knob 110' the violation flag is raised by the action of a spring 180 which acts torsionally against the hub of lever 172, and if the head 112' is not returned to its starting position (e.g. where an illegal slug is used) the violation flag remains elevated.

The foregoing description of the Duncan meter is given merely by way of identification and the parts included therein form no part of the present invention except as the token dispensing device of our invention is adapted and adapted thereto and combined therewith.

*Operation*

In the operation of a parking meter equipped with our token dispenser (e.g. in FIGS. 10–13) a purchaser of parking space will place a coin in the meter through the coin slot. The coin will be received in the coupling unit 112 where it will establish a driving connection between crank 110 and timer shaft 114.

With the driving connection to the timer shaft 114 established, the crank 110 is rotated, and the shaft 114 will be correspondingly rotated to an extent depending upon the denomination of the coin placed in the meter. A coin which will purchase half the time available on dial 116 will maintain the drive to shaft 114 sufficiently to rotate dial 115 approximately 90 degrees (thus bringing into view a portion of the time shown on dial 115 by time character 116) and at the same time will actuate the token dispenser 137 one stroke (through pin 163). A coin of twice the denomination will maintain the drive shaft 114 until all of indicia 116 are exposed and will actuate the slide 137 two strokes, first through pin 163 and then through pin 164. When pin 163 is released from the tip of dog 151 (at a point in its path of travel somewhat beyond that shown in FIG. 13) the slide 137 will be returned to its starting position by a spring 141 and pin 164 will then be in position to engage dog 151 and actuate the slide for its second stroke.

In each stroke of the slide, a token, received in slide opening 145 (when the slide is in its normal position) will be transported to the discharge port 146 (FIG. 13) and dropped through the port into a receptacle from which the customer can retrieve the token.

Upon shopping in a neighboring store sponsoring the redemption of such tokens, the customer can present the token or tokens to the store keeper and have the amount of his parking space purchase refunded to him.

The operation of the unit of FIGS. 14–16 is substantially the same. A coin of one denomination will project one of the dogs 166. A coin of another denomination will project the other dog 166. Drive will be maintained to disc 167 and thence to timer shaft 114' a proportionate part of the total stroke, greater or less depending upon which dog is projected. The extend of rotation of actuator disc 162 and the number of tokens dispensed, will correspondingly vary.

We claim:

1. In combination: a parking meter including a timer, indicator mechanism including a rotary part, and coin-controlled means for setting said indicator mechanism to indicate purchased time on the meter and for effecting the driving of said indicator mechanism by said timer to indicate time expiration on the meter; and means for dispensing merchantable tokens, comprising an axially-projecting slide-actuator lug carried by said rotary part of the indicator mechanism, and a dispensing slide having a part positioned to be engaged by said slide-actuator lug, said lug-engaged part having a spring-loaded connection to said slide such as to yield to return movement of said rotary part toward time-expired position without affecting the position of said slide.

2. In combination: a parking meter comprising a timer; a purchased time indicator including a rotary part, said indicator being driven by said timer to indicate time expiration on the meter; coin-controlled means for actuating said rotary indicator part for setting said indicator to indicate purchased time; and token-dispensing mechanism comprising a dispenser for dispensing a token having a predetermined redemption value, a plurality of dispenser-actuator projections carried by said indicator and spaced from one another along the path of movement of said indicator, and a coacting part projecting from said dispenser into the path of movement of said actuator projections and engaged thereby during said winding-setting movement, said coacting part being yieldable in response to engagement thereby during return movement of said actuator part in the time-expiration indicator movement of said indicator, without transmitting said return movement to said dispenser.

3. In a parking meter, in combination: a timer, a purchased-time indicator including an arcuately movable indicator part, said indicator being driven by said timer to indicate time expiration on the meter, coin-controlled means for setting said indicator to indicate purchased time on the meter; and token-dispensing mechanism comprising a dispenser for dispensing a token having a predetermined redemption value, a plurality of dispenser-actuator projections carried by said indicator part and spaced from one another along the path of movement of said indicator part, and a coacting part projecting from said dispenser into the path of movement of said actuator projections and engaged thereby during said winding-setting movement, said coacting part being yieldable in response to engagement thereby during return movement of said actuator part in the time-expiration indicator movement of said indicator, without transmitting said return movement to said dispenser.

4. A token-dispensing attachment for a parking meter having a spring-powered clockwork timer, a manually-operated actuator, a rotary indicator disc driven by said timer in time-expiring indicator movement, and transmission means, coin-driven from said actuator, for simultaneously winding said timer and setting said indicator disc, said attachment comprising: an axially-projecting slide-actuator lug carried by said indicator disc, and a dispensing slide having a part positioned to be engaged by said slide-actuator lug, said lug-engaged part having a spring-loaded connection to said slide such as to yield to return movement of said indicator disc toward time-expired position, without affecting the position of said slide.

5. In a parking meter, in combination: a spring-powered clock work timer, a purchased-timer indicator, driven by said timer to indicate time expiration on the meter, a manually-operated actuator, transmission means, coin-driven from said actuator, for simultaneously winding said timer and setting said indicator to indicate purchased time; and a token-dispensing attachment comprising a dispenser for dispensing a token having a predetermined redemption value, a plurality of dispenser-actuator projections carried by said indicator and spaced from one another along the path of movement of said indicator, and a coacting part projecting from said dispenser into the path of movement of said actuator projections and engaged thereby during said winding-setting movement, said coacting part being yieldable in response to engagement thereby during return movement of said actuator part in the time-expiration indicator movement of said indicator, without transmitting said return movement to said dispenser.

6. In combination with a parking meter having a spring-powered clock-work timer, a manually operated actuator, a purchased-time expiration indicator driven by said timer, and transmission means, coin-driven from said actuator, for simultaneously winding said timer and setting said indicator to indicate purchased time, a token-dispensing attachment comprising a slide-actuator part carried by said indicator, a dispensing slide disposed for linear movement in a horizontal plane for dispensing a token having a predetermined redemption value, a dog pivoted to said slide, spring means acting on said dog to normally maintain it in a projecting position for engagement by said actuator part and permitting said dog to yield to return movement of said actuator part without transmitting movement to said slide, and stop means for preventing yielding movement of said dog in the direction of dispensing movement of the slide, whereby to transmit such dispensing movement to the slide in response to engagement by said actuator part.

7. In combination with a parking meter having a spring-powered clockwork timer, a manually-operated actuator, a purchased-time indicator, a rotary indicator disc driven by said timer, and transmission means, coin-driven from said actuator, for simultaneously winding said timer and setting said indicator disc; token dispensing mechanism comprising an axially-projecting slide-actuator lug carried by said indicator disc, a dispensing slide having a dog pivoted thereon and positioned to be engaged by said slide-actuator lug during each winding-setting operation and to thereby be actuated to dispense a token having a predetermined redemption value, spring means acting on said dog to normally maintain it in a projecting position for engagement by said lug and permitting said dog to yield to return movement of said lug without transmitting movement to said slide, and stop means for preventing yielding movement of said dog in the direction of dispensing movement of the slide, whereby to transmit such dispensing movement to the slide in response to engagement by said lug.

8. In a parking meter, in combination: a timer; a purchased time indicator including a rotary indicator part driven by said timer in time-expiring indicator movement; a manually-operable rotary actuator having coin-responsive transmission means for setting said indicator part to indicate purchased time; a slide-actuator projection on said indicator part; a token-dispensing slide mounted in a horizontal plane for linear movement transverse to the axis of rotary movement of said indicator part; a token-holding magazine above said slide; means in which said slide is mounted for longitudinal token-dispensing movement from a position where it receives a token from said magazine to a position for delivering said token to a person purchasing time on the meter; a dog pivoted upon said slide for tilting movement and normally projecting transversely therefrom in the path of arcuate movement of said slide-actuator projection and engaged thereby during a meter-setting operation, for transmitting said token-dispensing movement to the slide in response to setting movement of said indicator part; a stop on said guide, engaged by said dog to limit movement thereof beyond said transversely projecting position in the direction of said token-dispensing slide movement and to render said dog operable to transmit such movement; and a spring acting between said slide and said dog to yieldingly maintain said dog normally in said projecting position, but yielding to return movement of said actuator projection to allow the same to pass said dog during return movement of the indicator toward time-expired position, without moving the slide.

9. In a parking meter, in combination: a timer; a purchased time indicator including an arcuately movable indicator part driven by said timer in time-expiring indicator movement; a manually operable rotary actuator; coin-driven means for transmitting movement from said rotary actuator to said movable indicator part to indicate purchased time on the meter; a dispenser-actuator projection on said indicator part; a token dispenser including a linearly movable dispensing element; a dog pivoted upon said dispensing element for tilting movement and normally projecting into the path of arcuate movement of said actuator projection and engaged thereby for transmitting a token-dispensing movement to said movable dispensing element in response to setting of the meter to indicate purchased time; and a spring yieldingly biasing said dog to its said projecting position and yieldable when said dog is engaged by said projection during return movement of said indicator part to time-expired position, to permit said return without moving said dispensing element.

10. In combination: a parking meter comprising a timer; a purchased time indicator including a rotary part, said indicator being driven by said timer to indicate time expiration on the meter; coin-controlled means for actuating said rotary indicator part for setting said indicator to indicate purchased time; and token-dispensing mechanism comprising a slide-actuator projection on said indicator part; a token-dispensing slide mounted in a horizontal plane for linear movement transverse to the axis of rotary movement of said indicator part; a token-holding magazine above said slide; means in which said slide is mounted for longitudinal token-dispensing movement from a position where it receives a token from said magazine to a position for delivering said token to a person purchasing time on the meter; a dog pivoted upon said slide for tilting movement and normally projecting transversely therefrom in the path of arcuate movement of said slide-actuator projection and engaged thereby during a meter-setting operation, for transmitting said token-dispensing movement to the slide in response to setting movement of said indicator part; a stop on said guide, engaged by said dog to limit movement thereof beyond said transversely projecting position in the direction of said token-dispensing slide movement and to render said dog operable to transmit such movement; and a spring acting between said slide and said dog to yieldingly maintain said dog normally in said projecting position, but yielding to return movement of said actuator projection to allow the same to pass said dog during return movement of the indicator toward time-expired position, without moving the slide.

11. In combination: a parking meter including arcuately movable parts embodied in a timer and a purchased time indicator driven by said timer to indicate time expiration on the meter; coin-controlled means for setting said indicator to indicate purchased time and to initiate the action of said timer in driving said indicator; a slide-acuator projection on one of said arcuately movable parts; a token-dispensing slide; a token-holding magazine above said slide; means in which said slide is mounted for longitudinal token-dispensing movement from a position where it receives a token from said magazine to a position for delivering said token to a person purchasing time on the meter; a dog pivoted upon said slide for tilting movement and normally projecting transversely therefrom in the path of arcuate movement of said slide-actuator projection and engaged thereby during a meter-setting operation, for transmitting said token-dispensing movement to the slide in response to setting movement of said indicator part; a stop on said guide, engaged by said dog to limit movement thereof beyond said transversely projecting position in the direction of said token-dispensing slide movement and to render said dog operable to transmit such movement; and a spring acting between said slide and said dog to yieldingly maintain said dog normally in said projecting position, but yielding to return movement of said actuator projection to allow the same to pass said dog during return movement of the indicator toward time-expired position, without moving the slide.

12. In a parking meter, in combination: a timer having a shaft; a purchased time indicator including an arcuately movable indicator part; a manually operable rotary actuator; coin-driven means operable to transmit rotation from said rotary actuator to said timer shaft and thus to said movable indicator part to indicate purchased time on the meter; a dispenser-actuator projection on said timer shaft; a token dispenser including a linearly movable dispensing element; and a part carried by said dispensing element and normally projecting into the path of arcuate movement of said actuator projection and engaged thereby for transmitting a token-dispensing movement to said movable dispensing element in response to setting of the meter to indicate purchased time.

13. In a parking meter, in combination: a timer having a shaft; a purchased time indicator including an arcuately movable indicator part; means for transmitting drive from said shaft to said indicator part; a manually operable rotary actuator; coin-driven means operable to transmit rotation from said rotary actuator to said timer shaft and thus to said movable indicator part to indicate purchased time on the meter; a dispenser-actuator projection on said timer shaft; a token dispenser including a linearly movable dispensing element; and a part carried by said dispensing element and normally projecting into the path of arcuate movement of said actuator projection and engaged thereby for transmitting a token-dispensing movement to said movable dispensing element in response to setting of the meter to indicate purchased time, said transmitting part being yieldable when engaged by said projection during return movement of said indicator part to time-expired position, to permit said return without moving said dispensing element.

14. In a parking meter, in combination: a timer having a shaft; a purchased time indicator including an arcuately movable indicator part; means for transmitting drive from said shaft to said indicator part; a manually operable rotary actuator; coin-driven means for transmitting movement from said rotary actuator to said timer shaft and thus to said movable indicator part to indicate purchased time on the meter; a dispenser-actuator projection on said timer shaft; a token dispenser including a linearly movable dispensing element; a dog pivoted upon said dispensing element for tilting movement and normally projecting into the path of arcuate movement of said actuator projection and engaged thereby for transmitting a token-dispensing movement to said movable dispensing element in response to setting of the meter to indicate purchased time; and a spring yieldingly biasing said dog to its said projecting position and yieldable when said dog is engaged by said projection during return movement of said indicator part to time-expired position, to permit said return without moving said dispensing element.

15. In a parking meter, in combination: a timer having a shaft; a purchased-time indicator including an arcuately movable indicator part; means for transmitting drive from said shaft to said indicator part; a manually operable rotary actuator; coin-driven means for transmitting movement from said rotary actuator to said timer shaft and thus to said movable indicator part to indicate purchased time on the meter; a dispenser-actuator projection on said timer shaft; a token dispenser including a linearly movable dispensing slide having an integral arm projecting upwardly from its forward margin; a dog pivoted upon said arm for lateral tilting movement and normally projecting upwardly into the path of arcuate movement of said actuator projection and engaged thereby for transmitting a token-dispensing movement to said movable dispensing element in response to setting of the meter to indicate purchased time; and a spring yieldingly biasing said dog to its said projecting position and yieldable when said dog is engaged by said projection during return movement of said indicator part to time-expired position, to permit said return without moving said dispensing element.

16. In a parking meter, in combination: a timer having a shaft; a purchased time indicator including an arcuately movable indicator part; means for transmitting drive from said shaft to said indicator part; a manually operable rotary actuator; coin-driven means for transmitting movement from said rotary actuator to said timer shaft and thus to said movable indicator part to indicate purchased time on the meter; a disc secured to the forward end of said timer shaft and having a plurality of forwardly extending dispenser-actuator projections; a token dispenser including a transversely slidable dispensing slide having an integral arm projecting upwardly from its forward margin; a dog pivoted upon said arm for lateral tilting movement and normally projecting upwardly into the path of arcuate movement of said actuator projections and engaged thereby for transmitting a token-dispensing movement to said dispensing slide in response to setting of the meter to indicate purchased time; and a spring yieldingly biasing said dog to its said projecting position and yieldable when said dog is engaged by said projection during return movement of said indicator part to time-expired position, to permit said return without moving said dispensing element.

17. In a parking meter, in combination: a meter frame; a purchased time indicator having a forwardly disposed indicator face and an arcuately movable indicator part; a timer adjacent said indicator, said timer having an indicator-drive shaft; means for transmitting drive from said shaft to said indicator part; a manually operable rotary meter-setting actuator handle at the rear of said frame; coin-coupled means disposed between said handle and said timer, for transmitting movement from said handle to said timer shaft and thus to said movable indicator part to indicate purchased time on the meter; a dispenser disc on the forward end of said timer shaft and rotated thereby, said disc having a forwardly projecting dispenser-actuator projection; a token dispenser slideway carried by said frame in a position near the bottom and the front thereof and extending horizontally parallel to said indicator face and transversely with reference to the axis of said timer shaft; a dispensing slide slidable in said slideway; a dog pivoted to said slide for tilting movement parallel to the direction of sliding movement thereof and normally projecting upwardly into the path of arcuate movement of said actuator projection and engaged thereby during setting of said meter by said handle, for transmitting a token dispensing movement to said slide; and means yieldingly biasing said dog to its said upwardly projecting position and yieldable when said dog is engaged by said projection during return movement of said indicator part to time-expired position, to permit said return without moving said dispensing element.

18. A parking meter as defined in claim 17, said dispenser disc having two actuator projections spaced circumferentially so as to actuate said slide twice for dispensing two tokens in succession when the amount of time set on the meter is double a selected unit of time, the path of movement of the leading projection rising above said dog so as to release the same when the first unit of time is set on the meter during such a double-unit setting operation; and a return spring for resetting said slide to a starting position when said dog is released.

19. In a parking meter, in combination: a meter frame; a purchased time indicator having a forwardly disposed indicator face and an arcuately movable indicator part; a timer adjacent said indicator, said timer having an indicator drive shaft; means for transmitting drive from said shaft to said indicator part; a manually operable rotary meter-setting actuator handle at the rear of said frame; coin-coupled means disposed between said handle and said timer, for transmitting rotary movement from said handle to said timer shaft and thus to said movable indicator part to indicate purchased time on the meter; a dispenser disc on the forward end of said timer shaft and rotated thereby, said disc having a plurality of forwardly projecting dispenser-actuator projections; a token dispenser slideway carried by said frame in a position below said timer and extending horizontally parallel to said indicator face and transversely with reference to the axis of said timer shaft; a dispensing slide slidable in said slideway and having an arm projecting upwardly therefrom; a dog pivoted to said arm for tilting movement parallel to the direction of sliding movement thereof and normally projecting upwardly into the path of arcuate movement of said actuator projections and engaged thereby during setting of said meter by said handle, for transmitting token dispensing movements to said slide; and means yieldingly biasing said dog to its said upwardly projecting position and yieldable when said dog is engaged by said projection during return movement of said indicator part to time-expired position, to permit said return without moving said dispensing element; said dispenser disc having two actuator projections spaced circumferentially so as to actuate said slide twice for dispensing two tokens in succession when the amount of time set on the meter is double a selected unit of time, the path of movement of the leading projection rising above said dog so as to release the same when the first unit of time is set on the meter during such a double-unit setting operation; and a return spring for re-setting said slide to a starting position when said dog is released.

20. A meter as defined in claim 19, wherein said arm has at its lower end a rearwardly bent integral connection to the forward margin of said slide, said slideway having in its forward side a longitudinal slot through which said arm connection extends and in which it is slidable.

References Cited by the Examiner

UNITED STATES PATENTS

| | | | |
|---|---|---|---|
| 977,393 | 11/10 | Morrison | 133—2 |
| 1,123,296 | 1/15 | Hibner | 133—2 |
| 2,070,445 | 2/37 | Miller. | |

SAMUEL F. COLEMAN, *Primary Examiner.*